Feb. 23, 1926.

C. R. ROBERTS

SHOCK ABSORBER

Filed July 16, 1925

1,574,000

Inventor

Charles R. Roberts

By F. K. A. Bigart,
Attorney

Patented Feb. 23, 1926.

1,574,000

UNITED STATES PATENT OFFICE.

CHARLES R. ROBERTS, OF ASHLAND, OREGON.

SHOCK ABSORBER.

Application filed July 16, 1925. Serial No. 43,976.

*To all whom it may concern:*

Be it known that I, CHARLES R. ROBERTS, a citizen of the United States of America, residing at Ashland, in the county of Jackson and State of Oregon, have invented certain new and useful Improvements in Shock Absorbers, of which the following is a specification.

This invention relates to new and useful improvements in shock absorbers.

The primary object of the invention is to provide a shock absorber which is suitable for use as a connection between at least two relatively movable members and which will function to absorb jolts, jars, or shocks applied to either or both members with the said jolts, jars, or shocks causing relative movement of said members either toward or away from each other or in both directions simultaneously.

A further object of the invention is to provide a connection for members which are caused to move relative to each other when jolts, jars, or shocks are applied to either or both, said connection functioning to permit slight relative movement of said members either toward or away from each other, but checking or snubbing said movements in either of said directions after the initial, allowed movement.

A still further object of the invention is to provide shock absorbers which may be employed for connecting the outer ends of automobile chassis bars and their supporting springs, said absorbers also being suitable as mountings for bumper bars when so employed.

Another object of the invention is to provide an improved form of mounting for the front springs of an automobile whereby all wabbling or shimmying of the front wheels will be prevented.

Other objects and advantages of the invention will be apparent during the course of the following description.

Figure 1:
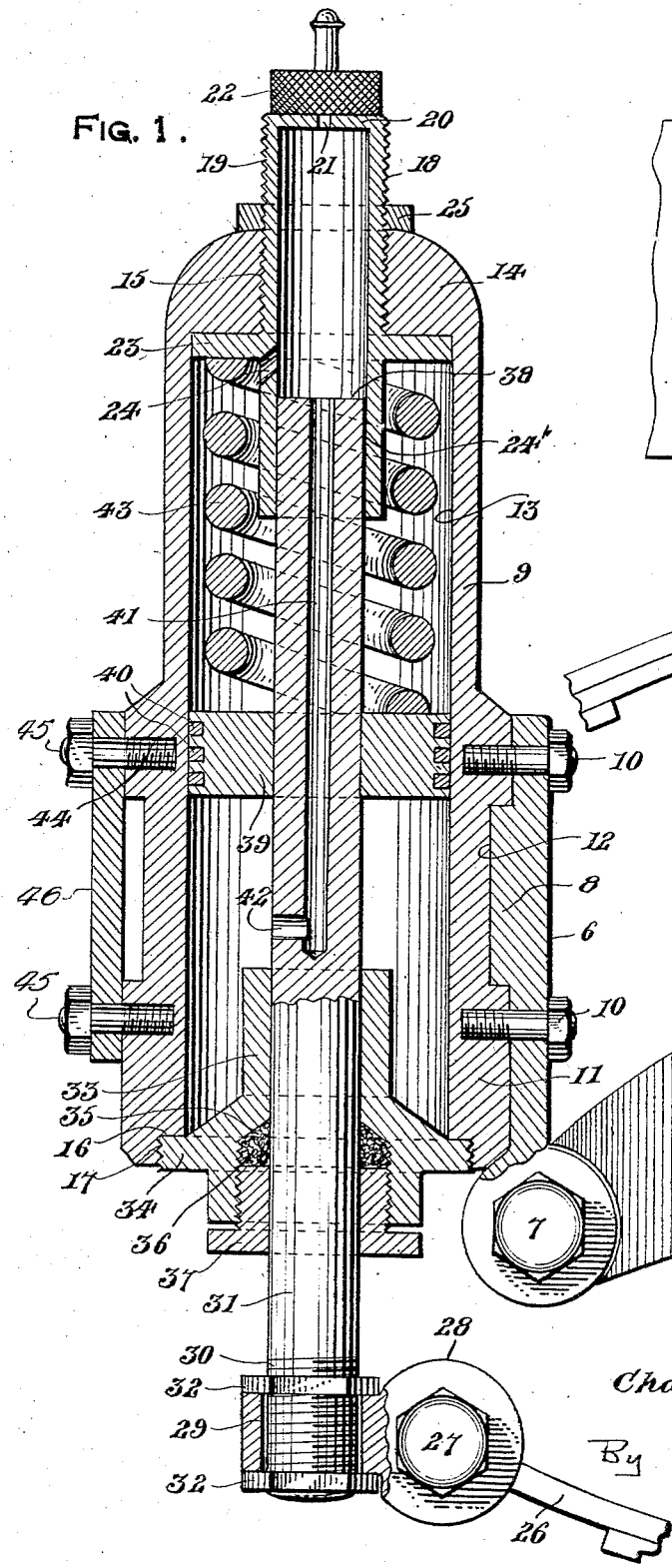
Figure 2:
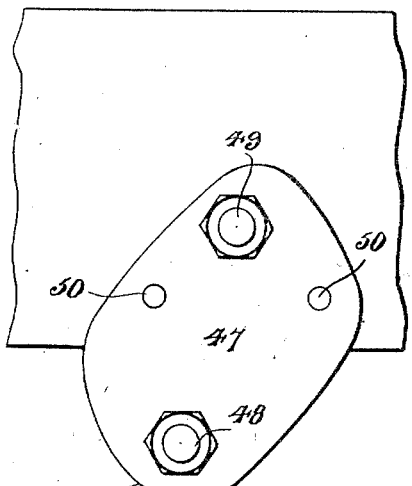

In the accompanying drawing forming a part of this specification and in which like numerals are employed to designate like parts throughout the same, Figure 1 is a vertical sectional view of the shock absorber embodying this invention shown mounted to connect the front ends of a chassis bar and the adjacent leaf spring, and Figure 2 is a fragmentary elevational view showing the connection between the said chassis bar and the rear end of the leaf spring shown in Fig. 1.

In the drawing, wherein for the purpose of illustration is shown a preferred embodiment of this invention, the numeral 5 designates the chassis bar of an automobile which has pivotally connected to its end the perpendicularly extending plate 6 by means of the pivot bolt 7. This plate 6 has a substantially rectangularly-shaped boss 8 projecting forwardly from the front face thereof.

The substantially barrel-shaped cylinder 9 is connected to the plate 6 by means of the screws 10 which pass through the said plate and are threaded into the thickened side wall portion 11 of the cylinder. This thickened portion 11 is formed with a transversely extending groove 12 into which projects the boss 8 of the plate 6.

The cylinder 9 has a uniform bore 13 and an end wall 14 which is formed with an internally threaded aperture 15. The remaining end of the cylinder 9 has its inner edge rabbeted at 16 and formed with internal threads 17.

Threaded into the aperture 15 of the end wall 14 of the cylinder is the externally threaded portion 18 of the cylinder 19 which is provided with one end wall 20 having an aperture 21 formed therein provided with a suitable closure 22 by means of which a compressible substance, such as a gas or a liquid, may be forced into the bore 13 of the cylinder 9 through the bore of the cylinder 19. This cylinder 19 is formed with an annular flange 23 which is located at the inner end of the threads 18 and separates the threaded portion 18 of the periphery of the cylinder 19 from the smooth portion 24 of said cylinder. This cylinder 19 is intended to be adjusted to vary the operative length of the bore 13 of the cylinder 9 by arranging the flange 23 at different points along the length of the same. The cylinder 19 may be held in any desired adjusted position by means of the jam or lock nut 25 which is threaded upon the portion 18 of the cylinder 19 and wedges against the outer face of the end wall 14 of the cylinder. It will be noted that the smooth portion 24' of the cylinder is provided with a port 24 which forms a communication between the bores of the cylinders 9 and 19.

The reference character 26 represents a semi-elliptical spring which has connected to its outer end by the pivot bolt 27 a lug 28 having the aperture 29 formed therein through which extends the threaded portion 30 of the piston rod 31 which is maintained therein by means of the lock nuts 32 arranged on opposite sides of the apertured portion of the lug 29.

This piston rod 31 extends into the bore 13 of the cylinder 9 and also enters the bore of the cylinder 19 at its upper end.

A cylindrically-shaped bearing 33 is connected to the threaded portion 17 of the rabbeted edge 16 of the cylinder 9 by means of the externally threaded annular flange 24. Outwardly of the bearing portion 33 there is formed a pocket 35 intended to receive the packing 36 which is held in place and compressed around the periphery of the piston rod 31 by the packing nut 37.

In spaced relation to the outer end 38 of the piston rod 31 a piston head 39 is suitably connected to the said rod, as by being shrunk thereupon or by being welded thereto. This piston head 39 is of a suitable size to permit being reciprocated through the bore 13 of the cylinder 9 and is formed with the piston rings 40 which functions in a well known manner to prevent leakage of the aforementioned compressible substance which is to be placed in the cylinder bore 13 and to be arranged on opposite sides of the piston head 39.

By inspecting Fig. 1, it will be seen that the piston rod 31 has a passageway 41 which enters the same from its end 38 and extends axially therethrough to terminate a suitable distance below the piston head 39. A port 42 is formed in the rod 31 and functions to establish a communication between the passageway 41 and the bore 13 of the cylinder 9 below the piston head 39.

Interposed between the lower face of the annular flange 23 carried by the cylinder 19 and the upper face of the piston head 39 is a compression spring 43 which will function to check or snub the movement of the piston head 39 upwardly through the bore 13 of the cylinder 9.

The functioning of the structure so far described to absorb shocks, jars, or jolts received by either of the relatively movable members 5 and 26 may be described in detail as follows:—

It is to be understood that a compressible substance is located in the cylinder 9 on opposite sides of the piston head 39 and that any desired amount of the said substance may be positioned within the cylinder. Any shock or jar applied to either of the members 5 or 26 which will cause the same to tend to move toward each other will cause the piston head 39 to move upwardly through the bore 13 of the cylinder 9. This movement of the cylinder head 39, of course, has been caused by a similar movement of the piston rod 31 upwardly through the bore 13 of the cylinder 9, the bore of the cylindrical bearing 33, and the bore of the adjustable cylinder. This upward movement of the piston head 39 will cause the compressible substance located above the head to be compressed and to endeavor to escape to the portion of the cylinder 9 below the piston head. During a portion of the upward movement of the piston rod 31 through the bore of the adjustable cylinder 19, this compressible substance will be permitted to pass into the bore of the cylinder 19 through the port 24' and downwardly through the passageway 41 formed in the piston rod to escape into the lower portion of the bore of the cylinder 19 through the port 42 which communicates with the passageway 41. It will now be seen that the port 24 and 42 and the passageway 41 form a by-pass by means of which the compressible substance may travel from one side of the piston head 39 to the other side. After the upper end 38 of the piston rod 31 has passed by the port 24 and has thereby closed the same, the substance above the piston head 39 will be prevented from escaping from the upper portion of the cylinder 9 to the portion of the said cylinder arranged below the piston head 39. This compressible substance trapped above the piston head will check or snub the upward movement of the piston head and will produce a dash-pot structure. The compression spring 43, also, will constantly function to check or snub the upward movement of the piston head 39 through the bore 13 of the cylinder 9.

When the relatively movable members 5 and 26 are returned to their normal relative positions, the piston head 39 will be returned to the position shown in Fig. 1 which is its normal position. This downward movement of the piston rod 31 will open the port 24 and will permit the substance located on opposite sides of the piston head 39 to become equalized. It will now be seen that the reciprocating of the end 38 of the piston rod 31 through the bore of the adjustable cylinder 19 will cooperate with the port 24 for producing a valve structure for controlling the by-pass by means of which the compressible substance may escape from the upper portion of the cylinder bore 13 into the lower portion of the same below the piston head 39.

When a suitable force is applied to either of the relatively movable members 5 and 26 to cause the same to move away from each other, the piston rod 31 and piston head 39 will be caused to move downwardly in respect to the cylinder 9. This downward movement of the piston head 39 will cause the compressible substance located below the same to be forced into the passageway 41 through the port 42 and from the upper end of the passageway into the bore of the adjustable cylinder 19 from which it will escape into the upper portion of the bore of the cylinder 9 by passing through the port 24. This escaping of the compressible substance from below the piston head 39 to the portion of the cylinder bore 13 located above the said head will permit the piston head to travel downwardly through the bore 13 as fast as the compressible substance is permitted to pass by the piston head into the upper portion of the cylinder 9. The downward movement of the rod 31, however, will soon cause the port 42 to pass into the bore of the cylindrical bearing 33 which will close the communication between the passageway for the compressible substance and the portion of the cylinder bore 13 arranged below the piston head 39. Downward movement of the piston head will then be checked or snubbed due to the compressing of the substance confined therebelow. It will now be seen that the cylindrical bearing 33 cooperates with the port 42 to form a valve structure to close the communication with the passageway 31 after a predetermined downward movement of the piston head 39 through the bore 13 of the cylinder 9.

The portion of the cylinder 9 arranged diametrically opposite the portion connected to the plate 6 is provided with the threaded sockets 44 into which the screws 45 may be threaded for fastening a bumper bar 46 to the said cylinders. It will be noted that this bumper bar is arranged above the pivot bolts 7 and 27 and that any pressure or jolts received by the said bar will cause the cylinder 9 to swing longitudinally of the chassis bar 5 upon the pivot bolt 7. This swinging of the cylinder 9 will cause the piston head 39 to travel downwardly through the bore 13 of the cylinder and thereby check the movement of the cylinder. In other words, the shock absorbing feature of the compressible substance below the piston head 39 will receive and absorb any jolts received by the bumper bar. It will also be noted that a bumper bar will brace the two shock absorber structures which must constitute the necessary equipment for the front or rear end of an automobile and which are connected to the outer ends of the chassis bars and the outer ends of the supporting springs.

Figure 2 shows the chassis bar 5 at the point where the inner end of the semi-elliptical spring 26 is to be connected thereto. The desired form of connection between this end of the spring 26 and the bar 5 includes what will be termed a stationary plate 47 which will be connected to the end of the spring 26 by the bolt 48 and to the chassis bar 5 by the bolt 49 and additional bolts or rivets 50 which will prevent pivotal movement of the stationary plate 47 in respect to the chassis bar 5. This manner of connecting the inner end of a spring to a chassis bar is intended to prevent any swinging of this end of the spring in respect to the bar so that all of the relative movement between the spring and bar must occur at the ends provided with the shock absorber structure. This mounting is further intended to do away with all wabbling or shimmying of the front wheels of an automobile.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In a shock absorber of the type described, a closed cylinder, a piston head in said cylinder, means connected to said head and projecting out of the cylinder by means of which the head may be reciprocated, a compressible substance in the cylinder on both sides of the head, a by-pass around said head for permitting the substance to escape from one side to the other of said head when the latter is reciprocated, means independent of said head for closing the by-pass after the head has reciprocated a predetermined distance in either direction from its normal position, a compression spring on one side of the piston head for determining the said normal position of the latter, and means for simultaneously changing the location of said normal position and changing said predetermined distance the head may move before the by-pass is closed.

2. In a shock absorber of the type described, a closed cylinder, a piston head in said cylinder, means connected to said head and projecting out of the cylinder by means of which the head may be reciprocated, a compressible substance in the cylinder on both sides of the head, a by-pass around said head for permitting the substance to escape from one side to the other of said head when the latter is reciprocated, means independent of said head for closing the by-pass after the head has reciprocated a predetermined distance in either direction from its normal position, a compression spring on one side of the piston head for determining the said normal position of the latter, and means for shortening the by-pass and bodily moving the compression spring for changing said normal position of the head and for changing the predetermined distance said head may move before the by-pass is closed.

3. In a shock absorber of the type described, a main cylinder, a cylindrical structure connected to one end of the main cylinder and projecting axially thereinto, the projecting portion of said cylindrical structure having a port formed in the wall thereof to provide a communication between the bores of the main cylinder and the cylindrical structure, a cylindrically-shaped bearing connected to the remaining end of the main cylinder and projecting thereinto, a piston rod slidable in the bore of the cylindrical structure and the cylindrically-shaped bearing and projecting from the main cylinder through said cylindrically-shaped bearing, an axial passageway formed in the piston rod and communicating with the bore of the cylindrical structure at one end and a lateral port formed in the rod at the opposite end, a piston head fastened in the rod between the ends of the passageway, and a compressible substance in said main cylinder on each side of the piston head, whereby the sliding movement of the piston rod and head will cause the compressible substance to pass from one side to the other of said piston head through said ports and passageway.

4. In a shock absorber of the type described, a main cylinder, a cylindrical structure connected to one end of the main cylinder and projecting axially thereinto, the projecting portion of said cylindrical structure having a port formed in the wall thereof to provide a communication between the bores of the main cylinder and the cylindrical structure, a cylindrically-shaped bearing connected to the remaining end of the main cylinder and projecting thereinto, a piston rod slidable in the bore of the cylindrical structure and the cylindrically-shaped bearing and projecting from the main cylinder through said cylindrically-shaped bearing, an axial passageway formed in the piston rod and communicating with the bore of the cylindrical structure at one end and a lateral port formed in the rod at the opposite end, a piston head fastened on the rod between the ends of the passageway, and a compressible substance in said main cylinder on each side of the piston head, whereby the sliding movement of the piston rod and head will cause the compressible substance to pass from one side to the other of said piston head through said ports and passageway, the passage of the substance through said ports being alternately stopped as the piston rod is reciprocated to pocket the substance first on one side and then on the other side of said head.

5. In a shock absorber of the type described, a main cylinder, a cylindrical structure connected to one end of the main cylinder and projecting axially thereinto, the projecting portion of said cylindrical structure having a port formed in the wall thereof to provide a communication between the bores of the main cylinder and the cylindrical structure, a cylindrically-shaped bearing connected to the remaining end of the main cylinder and projecting thereinto, a piston rod slidable in the bores of the cylindrical structure and the cylindrically-shaped bearing and projecting from the main cylinder through said cylindrically-shaped bearing, an axial passageway formed in the piston rod and communicating with the bore of the cylindrical structure at one end and a lateral port formed in the rod at the opposite end, a piston head fastened in the rod between the ends of the passageway, a compressible substance in said main cylinder on each side of the piston head, whereby the sliding movement of the piston rod and head will cause the compressible substance to pass from one side to the other of said piston head through said ports and passageway, the passage of the substance through said ports being alternately stopped as the piston rod is reciprocated to pocket the substance first on one side and then on the other side of said head, and a compression spring engaging one end of the main cylinder and one face of the piston head.

6. In a shock absorber of the type described, a main cylinder, a cylindrical structure having a lateral flange and adjustably connected to one end of the main cylinder to project axially thereinto, the projecting portion of said cylindrical structure having a port formed in the wall thereof to provide a communication between the bores of the main cylinder and the cylindrical structure, a cylindrically-shaped bearing connected to the remaining end of the main cylinder and projecting thereinto, the lateral flange carried by the cylindrical structure being moved axially through the bore of the main cylinder when the said structure is adjusted, a piston rod slidable in the bore of the cylindrical structure and the bore of the cylindrically-shaped bearing and projecting from the main cylinder through said bearing, an axial passageway formed in the piston rod and communicating with the bore of the cylindrical structure at one end and a lateral port formed in the rod at the opposite end, a piston head fastened on the rod between the ends of the passageway, a compressible substance in said main cylinder on each side of said piston head whereby the sliding movement of the piston rod and head will cause the compressible substance to pass from one side to the other of said head through the ports and passageway, the passage of the substance through said port being alternately stopped as the piston rod is reciprocated to pocket the substance first on one side and then on the other side of said head, and a compression spring engaging the lateral flange at one end and one face of the piston head at its remaining end.

In testimony whereof I affix my signature.

CHARLES R. ROBERTS.